(12) United States Patent
Kopecek et al.

(10) Patent No.: US 8,127,732 B2
(45) Date of Patent: Mar. 6, 2012

(54) LASER IGNITION SYSTEM AND METHOD FOR INTERNAL COMBUSTION ENGINE

(75) Inventors: Herbert Kopecek, Hallbergmoos (DE); Nirm Velumylum Nirmalan, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 340 days.

(21) Appl. No.: 12/488,761

(22) Filed: Jun. 22, 2009

(65) Prior Publication Data

US 2010/0319643 A1 Dec. 23, 2010

(51) Int. Cl.
*F02P 23/04* (2006.01)
*F02P 23/00* (2006.01)

(52) U.S. Cl. .................................. 123/143 B
(58) Field of Classification Search ............... 123/143 B, 123/143 R, 594; 372/23, 71, 70, 25; 60/203.1
See application file for complete search history.

(56) References Cited

U.S. PATENT DOCUMENTS

| | | |
|---|---|---|
| 3,861,371 A | 1/1975 | Gamell |
| 4,416,226 A | 11/1983 | Nishida et al. |
| 4,434,753 A | 3/1984 | Mukainakano et al. |
| 4,852,529 A | 8/1989 | Vowles |
| 4,947,640 A | 8/1990 | Few et al. |
| 5,367,869 A | 11/1994 | DeFreitas |
| 5,983,871 A | 11/1999 | Gordon et al. |
| 6,053,140 A | 4/2000 | Feichtinger et al. |
| 6,796,278 B2 | 9/2004 | Ryan, III |
| 7,036,476 B2 | 5/2006 | Wintner et al. |
| 7,040,270 B2 | 5/2006 | Herdin et al. |
| 7,318,411 B1 | 1/2008 | Zhu et al. |
| 2002/0185097 A1 | 12/2002 | Ryan, III |
| 2007/0000465 A1 | 1/2007 | Scarisbrick et al. |
| 2007/0068475 A1 | 3/2007 | Kopecek et al. |
| 2007/0102575 A1 | 5/2007 | Morgan et al. |
| 2008/0264371 A1 * | 10/2008 | Taido et al. ............... 123/143 B |
| 2009/0044776 A1 | 2/2009 | Klausner et al. |

FOREIGN PATENT DOCUMENTS

| | | |
|---|---|---|
| JP | 2006144618 A * | 6/2006 |
| JP | 2006242034 A | 9/2006 |
| JP | 2006242038 A | 9/2006 |
| JP | 2009052789 | 8/2007 |
| JP | 2009052790 | 8/2007 |
| WO | 02095220 A1 | 11/2002 |

OTHER PUBLICATIONS

GB1009836.6 Search Report, Nov. 30, 2010.
JP2006242034 Abstract, Sep. 14, 2006.
JP2006242038 Abstract, Sep. 14, 2006.
GB1009836.6 Search Report, Sep. 15, 2010.
JP2009052789 Abstract, Aug. 24, 2007.
JP2009052790 Abstract, Aug. 24, 2007.

* cited by examiner

*Primary Examiner* — Mahmoud Gimie
(74) *Attorney, Agent, or Firm* — Penny A. Clarke

(57) ABSTRACT

A laser beam ignition system for an internal combustion engine is provided. The laser beam ignition system comprises a laser configured to generate a laser beam, and a beam steering unit comprising a lens and a prism both configured to cooperatively transmit the laser beam to focus on an oxygenated fuel mixture supplied into a combustion chamber of the internal combustion engine. A beam steering unit and a method for igniting a fuel mixture in an internal combustion engine are also presented.

24 Claims, 4 Drawing Sheets

LASER IGNITION SYSTEM AND METHOD FOR INTERNAL COMBUSTION ENGINE

BACKGROUND

This invention relates generally to ignition systems for internal combustion engines. More particularly, this invention relates to laser ignition systems for internal combustion engines with continuous combustion.

For internal combustion engines, fuel is combusted with an oxidizer (usually air) in combustion chambers. The resulting high temperature and pressure gases expand and thereby apply forces to movable components of the engines, such as turbine blades to drive the turbine. Combustion can be intermittent (as for example, in automotive applications) or continuous (as for example, in gas turbines and jet engines).

In a conventional ignition apparatus for internal combustion engines, a high voltage is applied to an ignition plug that is fixed on a wall surface of the combustion chamber in order to ignite an air-fuel mixture by spark discharge. However, in an ignition apparatus of this kind, since the ignition plug is exposed directly to the combustion chamber, carbon attaches to the ignition plug to render the discharge of the ignition plug difficult. Furthermore, due to a heat loss of the electrodes of the ignition plug, a torch or nucleus of flame generated by the discharge is cooled, and vanishes before reaching a flame. Additionally, since the ignition occurs on or very near the wall surface, poor mixing often results due to the difficulties associated with burning fuel from the wall surface.

Therefore, there is a need for a new and improved ignition system and method for internal combustion engines.

BRIEF DESCRIPTION

A laser ignition system for an internal combustion engine is provided in accordance with one embodiment of the invention. The laser ignition system comprises a laser configured to generate a laser beam, and a beam steering unit comprising a lens and a prism both configured to cooperatively transmit the laser beam to focus on an oxygenated fuel mixture supplied into a combustion chamber of the internal combustion engine.

A beam steering unit is provided in accordance with another embodiment of the invention. The beam steering unit comprises a lens and a prism. The lens is configured to focus and transmit a laser beam to the prism, and the prism is configured to transmit the focused laser beam to focus on an oxygenated fuel mixture supplied into a combustion chamber of an internal combustion engine.

Another embodiment of the invention is directed to a method for igniting a fuel mixture in an internal combustion engine. The method comprises generating a laser beam, transmitting the laser beam through a lens to form a focused laser beam, and transmitting the focused laser beam through a prism to focus the laser beam on the fuel mixture supplied into a combustion chamber of the internal combustion engine.

A laser ignition system for an internal combustion engine is provided in accordance with yet another embodiment of the invention. The laser ignition system comprises a laser configured to generate a laser beam, and a beam steering unit comprising an adaptive lens and a transparent window. The adaptive lens and the transparent window are configured to cooperatively transmit the laser beam to focus at a plurality of locations within a combustion chamber of the internal combustion engine.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION OF THE INVENTION

Embodiments of the present disclosure are described herein with reference to the accompanying drawings. In the subsequent description, well-known functions or constructions are not described in detail to avoid obscuring the disclosure in unnecessary detail.

Figure 1:
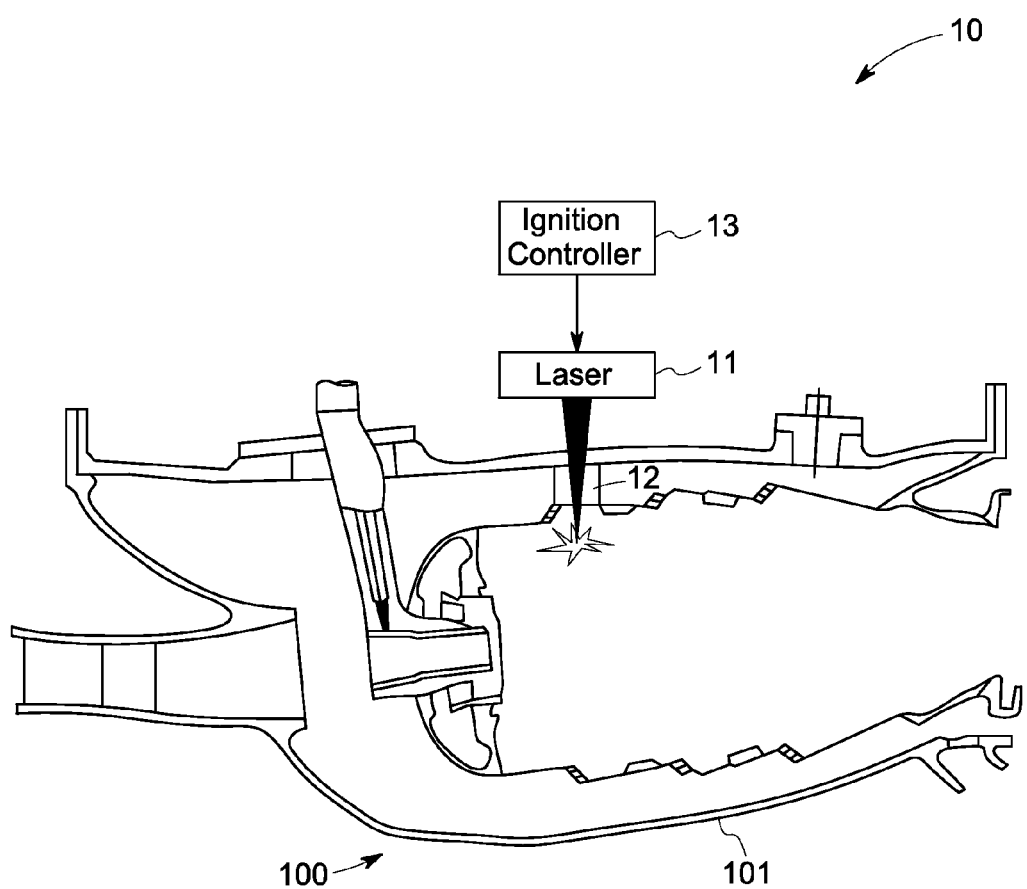
FIG. 1 is a schematic diagram of a laser ignition system in accordance with one embodiment of the invention.

FIG. 1 illustrates a schematic diagram of a laser ignition system 10 in accordance with one embodiment of the invention. In embodiments of the invention, the laser ignition system 10 is configured to generate and guide a laser beam to focus into a chamber, such as a combustion chamber 101 of an internal combustion engine 100 to ignite combustive mediums, such as an oxygenated fuel mixture therein. As used herein, the phrase "internal combustion engine" encompasses engines with continuous combustion and engines with intermittent combustion. Non-limiting examples of the internal combustion engine 100 includes a reciprocating engine, a gas turbine engine, a jet engine, a diesel engine, and a rotary engine.

As illustrated in FIG. 1, the laser ignition system 10 comprises a laser 11 configured to generate a laser beam and a beam steering unit 12 in optical communication with the laser 11 and configured to guide the laser beam from the laser 11 to focus into the combustion chamber 101 of the internal combustion engine 100. Further, the laser ignition system 10 comprises an ignition controller 13 coupled to the laser 11 to control the generation of the laser beam from the laser 11.

In the illustrated arrangement, the ignition controller 13 is separated from the laser 11. Alternatively, the ignition controller 13 may be integral with the laser 11. It should be noted that the present invention is not limited to any particular controller for performing the processing tasks of the invention. The term "controller", as that term is used herein, is intended to denote any machine capable of performing the calculations, or computations, necessary to perform the tasks of the invention. The term "controller" is intended to denote any machine that is capable of accepting a structured input and of processing the input in accordance with prescribed rules to produce an output, as will be understood by those skilled in the art.

In some applications, the ignition controller 13 may accept ignition requests from pilots and/or be operated based on engine operational parameters, such as crank angles, speeds, engine operational temperatures, accelerator positions, exhaust quality, and measured fuel variables, etc. Accordingly, in some examples, one or more detection units, such as photodetectors (not shown) know in the art may be provided to sense the operational parameters of the internal combustion engine 100, and may relay corresponding information to the ignition controller 13 to control the generation and/or the focusing of the laser beam.

In one non-limiting example, the ignition controller 13 may include a laser control circuit and/or an ignition timing control circuit. As is known in the art, the laser control circuit may synchronize laser oscillations with the ignition timing. The ignition timing control circuit may include a control circuit that includes an ignition timing calculating circuit that calculates the ignition timing based on detected engine operational conditions. Further description of such example control units may be found in U.S. Pat. No. 4,416,226, entitled "Laser ignition apparatus for an internal combustion engine," which is incorporated by reference herein. In certain applications, an Electronic Control Unit (ECU) may be used as the ignition controller 13, or in conjunction with the ignition controller 13.

In some embodiments, the laser 11 may be any laser apparatus know in the art that is capable of emitting sufficient energy, so that the energy may focus into the combustion chamber 101 of the internal combustion engine 100 to ignite the combustive mediums, such as fuel, fuel-air mixtures or premixed mixtures therein. Examples of the laser 11 include, but are not limited to, Neodymium-type lasers, Erbium-type lasers, other solid-state lasers, or other suitable lasers such as semiconductor lasers.

In some embodiments, the laser ignition process may take place by any one or combination of at least three ignition mechanisms including, but are not limited to, photochemical ignition, thermal ignition, and laser-induced spark ignition.

In photochemical ignition, laser photons dissociate target molecules, such as the fuel or fuel-air mixtures, into highly reactive radical species. These radicals then initiate a rapid chemical chain reaction, or combustion. As is known in the art, photochemical ignition requires a close match between the laser excitation wavelength and the target molecule's absorption wavelength in order for dissociation to occur.

Thermal ignition uses a laser to increase kinetic energy, in either translational, rational, or vibrational form, of target molecules. As a result, molecular bonds are broken and chemical reactions can take place. This mechanism may be used to ignite combustibles in combinations of solid, liquid, and gas phases. Heating of the material with this technique may be performed with infrared lasers.

In laser-induced spark ignition, a laser beam is focused to create a plasma kernel, or spark. Such spark emits light, heat, and a shock wave to the surrounding medium, supplying energy to initiate combustion. The laser-induced spark ignition may primarily constitute a thermal chemical process, in which the heat generated in both the laser spark and the shock wave is used for ignition.

As depicted in FIG. 1, the beam steering unit 12 is disposed on the internal combustion engine 100 and is in communication with the combustion chamber 101. Thus, the laser beam from the laser 11 may be guided and focused into the combustion chamber 101 to ignite the fuel and fuel-air mixtures therein.

Figure 2:
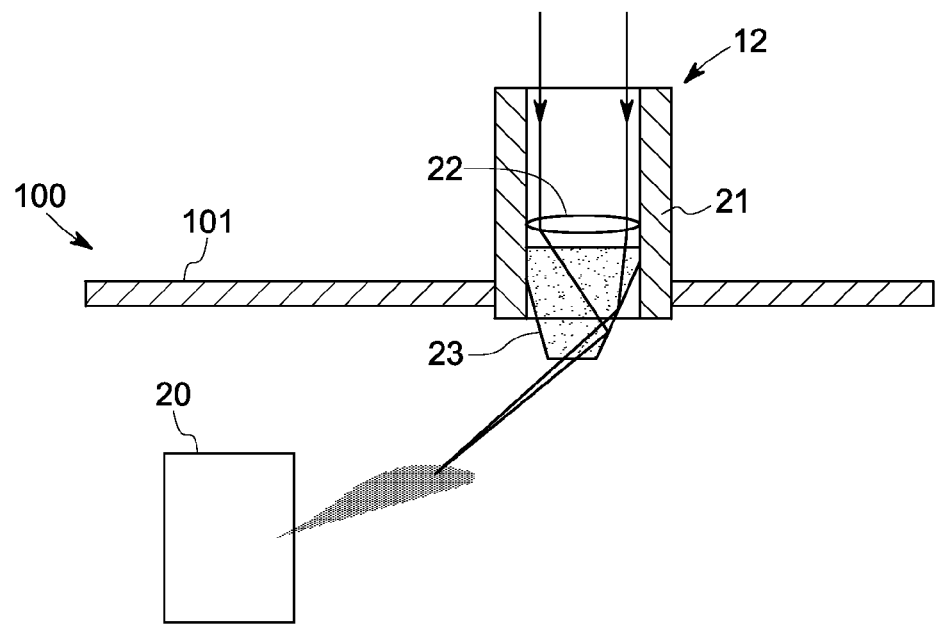
FIG. 2 is a schematic diagram of a beam steering unit of the laser ignition system in accordance with one embodiment of the invention.

FIG. 2 is a schematic diagram of the beam steering unit 12 of the laser ignition system 10 in accordance with one embodiment of the invention. It should be noted that depicted arrangement in FIG. 2 is merely illustrative. For ease of illustration, the laser 11 and the ignition controller 13 are not illustrated. A nozzle 20 in the internal combustion engine 100 is illustrated to show a spray of the combustive mediums, as well as ignition position(s) of the laser beam within the combustion chamber 101.

As illustrated in FIG. 2, the internal combustion engine 100 defines an opening (not labeled). The beam steering unit 12 comprises a housing 21, a lens 22, and a prism 23. The housing 21 is accommodated into the opening with one end thereof, so that the housing 21 is held onto the combustion engine 100 and communicates with the combustion chamber 101. The lens 22 and the prism 23 are accommodated within the housing 21. In certain applications, the beam steering unit 12 may comprise more than one lens, more than one prism, and/or other optics.

In one non-limiting example, the housing 21 may comprise a hollow columnar shape to accommodate the lens 22 and the prism 23. Alternatively, the housing 21 may have any other shape suitable for holding the lens and the prism 23. In the illustrated arrangement, the lens 22 and the prism 23 are disposed in the housing 21. During operation, the lens 22 focuses and transmits the laser beam to the prism 23. The focused laser beam from the lens 22 then passes thought the prism 23 and towards the nozzle 20 in a direction offset from an axial direction (not shown) of the lens 22 to enter into the combustion chamber 101 to ignite the combustive medium sprayed from the nozzle 20 at desired location(s). In some examples, a bottom portion (not labeled) of the prism 23 may extend beyond a lower portion of the housing 21 and into the combustion chamber 101. Additionally, in certain examples, the spray of the combustion medium from the nozzle 20 may be cone-shaped. Alternatively, the nozzle 20 may spray the combustive mediums with other shapes.

For some arrangements, the lens 22 may comprise a conventional lens, or any lens with high efficiency, and good focus. The prism 23 may comprise any prism suitable for relaying the focused laser beam to ignite the combustive medium at ignition location(s) within the combustion chamber 101. In one non-limiting example, the prism 23 may comprise a reflective prism. For the illustrated arrangement, the prism 23 comprises a four-sided reflective prism.

Figure 3:
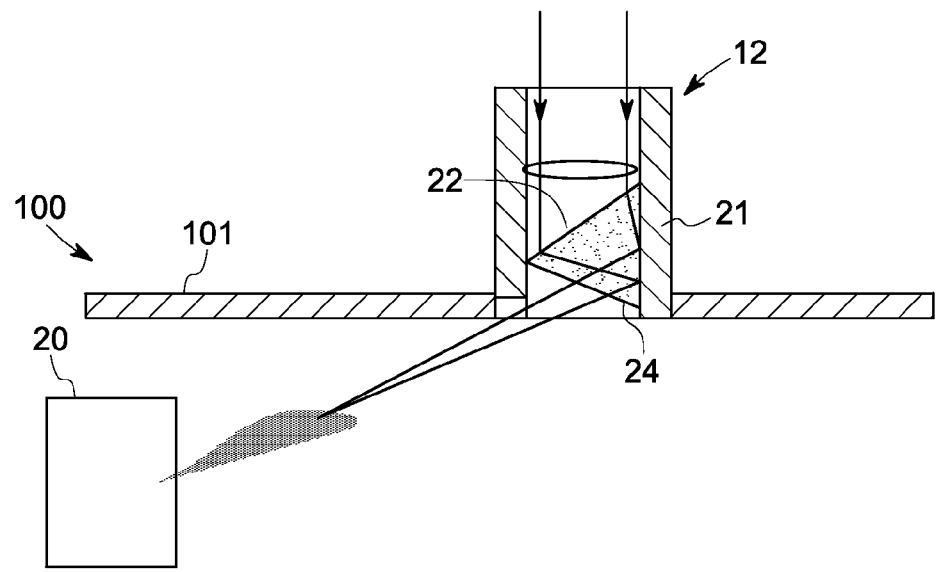
FIG. 3 is a schematic diagram of the beam steering unit in accordance with another embodiment of the invention.

FIG. 3 is a schematic diagram of the beam steering unit 12 in accordance with another embodiment of the invention. For ease of illustration, the same numerals may be used to indicate similar elements in the figures. As illustrated in FIG. 3, the illustrated arrangement is similar to the arrangement in FIG. 2, and the beam steering unit 12 comprises a housing 21, a lens 22, and a three-sided reflective prism 24 instead of four-sided reflective prism 23. Thus, lens 22 focuses and transmits the laser beam to the prism 24. The prism 24 transmits the focused laser beam towards the nozzle 20 in a direction offset from the axial direction of the lens 22 to ignite the combustive medium from the nozzle 20 at desired location(s) within the combustion chamber 101.

For the illustrated arrangement, the lens 22 and prism 24 do not extend into the combustion chamber 101. Thus, the lens 22 and prism 24 are partially shielded from the heat from the combustion chamber 101 and do not disturb the aerodynamics within the combustion chamber 101. Additionally, in non-limiting examples, the prism 23 and/or 24 may reflect the laser beam using the natural effect of total reflection. Alternatively, the prism 23 and/or 24 may be coated with reflective coatings to reflect the laser beam, which can be readily implemented by one skilled in the art.

In some applications, the beam steering unit may be adaptive. That is, the beam steering unit may comprise one or more adaptive optical elements that are suitable for adjusting the focusing position of the laser beam emitted from the laser 11. In some embodiments, the term "adaptive," as is used herein, is intended to denote that the optical elements are adjustable in some manner in a controllable fashion so that the laser radiation may be directed to different locations within, for example, the combustion chamber 101. Adaptive optical elements may take several forms, as will be apparent to those skilled in the art with the benefit of the illustrated embodiments of the invention.

Figure 4:
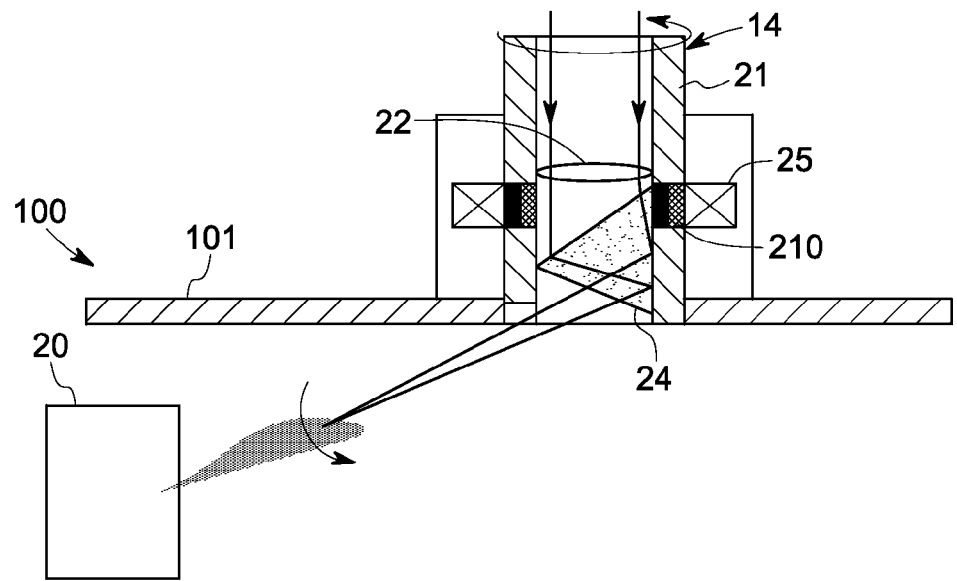
FIG. 4 is a schematic diagram of an adaptive beam steering unit of the laser ignition system in accordance with one embodiment of the invention.

FIG. 4 is a schematic diagram of an adaptive beam steering unit 14 including one or more adaptive optical elements in accordance with one embodiment of the invention. As depicted in FIG. 4, the beam steering unit 14 comprises the housing 21, the lens 22, the three-sided reflective prism 24, and a coil driver 25. In the illustrated arrangement, the housing 21 is rotatively held into the combustion engine 100 and at least a part 210 of the housing 21 is magnetized. The coil driver 25 extends around the housing 21, so that the coil driver 25 may cooperate with the magnetized part 210 of the housing 21 to rotate the housing 21 when the coil driver 25 is powered by an electrical source (not shown).

Thus, the lens 22 and the prism 24 may rotate with the rotation of the housing 21, so that the laser beam may be transmitted towards the nozzle 20 and rotatably focused at a plurality of locations within the combustion chamber 101 to ignite the combustive medium sprayed from the nozzle 20. In one non-limiting example, the coil driver 25 may comprise a metal winding driver, such as a copper winding driver. For the illustrated arrangement, the coil driver 25 is assembled onto the internal combustion engine 100 and arranged around the housing 21. Alternatively, the coil driver 25 may be assembled onto the housing 21.

Figure 5:
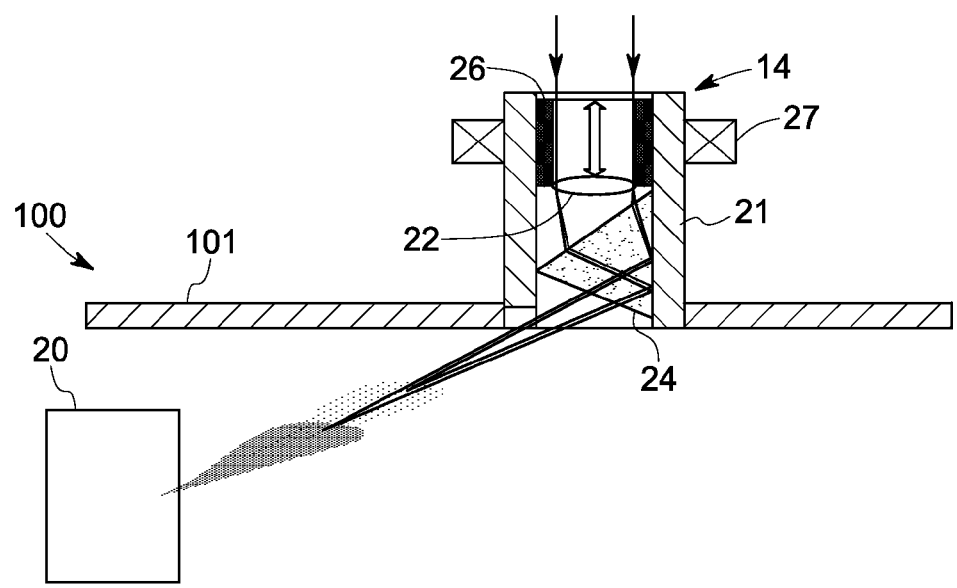
FIG. 5 is a schematic diagram of the adaptive beam steering unit including one or more adaptive optical elements in accordance with another embodiment of the invention.

FIG. 5 is a schematic diagram of the adaptive beam steering unit 14 in accordance with another embodiment of the invention. As illustrated in FIG. 5, the adaptive beam steering unit 14 comprises the housing 21, the lens 22, the prism 24, a holder 26, and a coil driver 27. The housing 21 is mounted on the internal combustion engine 100. The lens 22 is disposed within the holder 26. The holder 26 is magnetized and moveably accommodated in the housing 21. The coil driver 27 is disposed around the housing 21, so that the coil driver 27 drives the magnetized holder 26 to move linearly in the housing 21 when the coil driver 27 is powered by an electrical source (not shown). Thus, the lens 22 moves in the housing 21 with the movement of the holder 26 to direct the laser beam to focus on different locations within the combustion chamber 101.

In one non-limiting example, similar to the coil driver 25, the coil driver 27 may also comprise a metal winding driver, such as the copper winding driver. For the illustrated arrangement, the coil driver 27 is assembled onto the housing 21. Alternatively, the coil driver 27 may be assembled onto the engine 100 and disposed around the housing 21. Further, in certain examples, the prism 24 may also be moveably accommodated in the housing 21.

In certain applications, the arrangements in FIGS. 4 and 5 may be combined, so that the lens 22 may be moveable (such as rotatable and/or moveable linearly) relative to the internal combustion engine 100 to direct the laser beam to focus on different locations within the combustion chamber 101. For example, the beam steering unit 14 may comprise the magnetized housing 21, the magnetized holder 26, the lens 22, the prism 24, and one or more drivers 25 and 27 to make the lens 22 rotate and/or move linearly relative to the internal combustion engine 100, which can be readily implemented by one skilled in the art. Additionally, for the arrangements in FIGS. 4 and 5, the prism may comprise other suitable prisms, such as the reflective prism 23.

Figure 6:
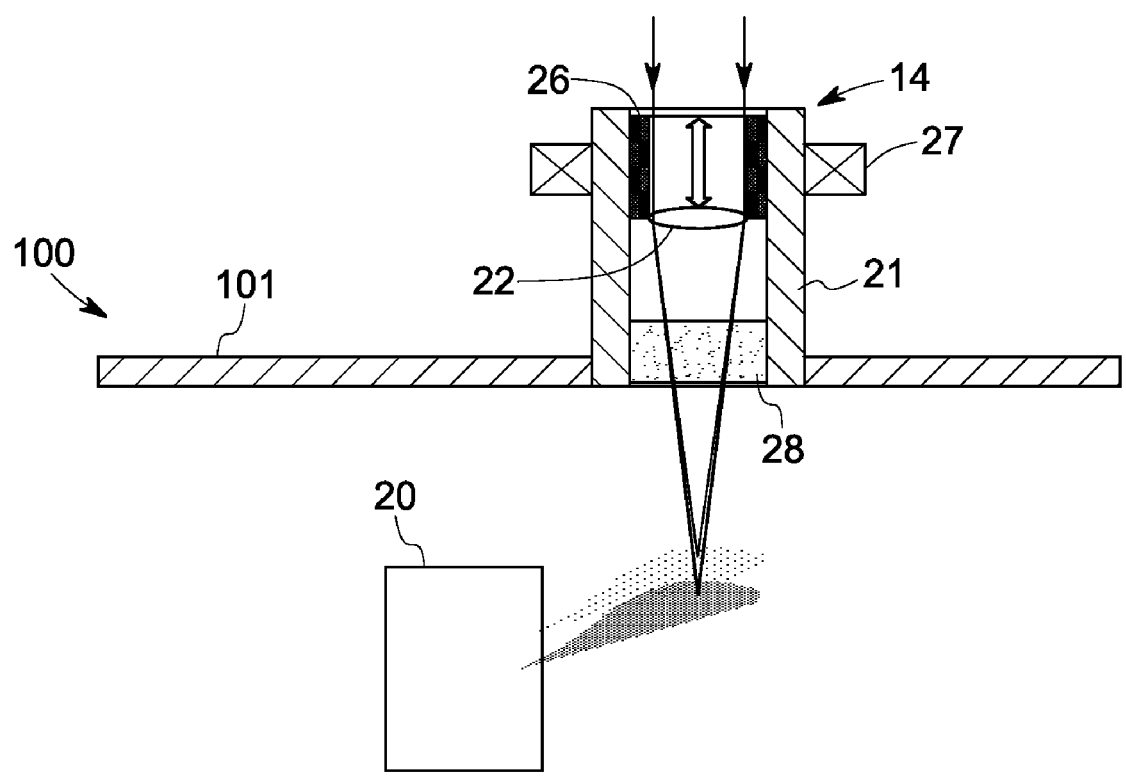
FIG. 6 is a schematic diagram of the adaptive beam steering unit in accordance with yet another embodiment of the invention.

FIG. 6 is a schematic diagram of the adaptive beam steering unit 14 in accordance with yet another embodiment of the invention. The arrangement in FIG. 6 is similar to the arrangement in FIG. 5. As depicted in FIG. 6, the adaptive beam steering unit 14 comprises the housing 21, the lens 22, the magnetized holder 26, the coil driver 27, and a transparent window 28 instead of the prism 24.

In the illustrated embodiment, the housing 21 is not magnetized. Alternatively, the housing 21 may also be magnetized. The transparent window 28 is disposed within the opening of the engine 100, and may be made of any material suitable to transmit the laser radiation. In one embodiment, the transparent window 28 may be made of quartz or sapphire, although those skilled in the art will recognize that other materials may be used, such as industrial diamonds, conventional glasses, or fused silica.

Thus, similar to the arrangement in FIG. 5, the coil driver 27 drives the magnetized holder 26 to move in the housing 21 when the coil driver 27 is powered by an electrical source (not shown). The lens 22 moves in the housing 21 with the movement of the holder 26 to direct the laser beam through the transparent window 28 to focus on a plurality of locations within the combustion chamber 101 along the axial direction of the lens 22. In certain examples, the arrangement in FIG. 6 may also be combined with the arrangement in FIG. 4 so as to rotate and move the lens 22 linearly relative to the internal combustion engine 100.

In certain embodiments, for the arrangements in FIGS. 4, 5 and 6, the beam steering unit 14 may comprise other drivers, such as piezo-electric actuators, hydraulic drivers, and/or pneumatic drivers in addition to the copper winding driver 25 or 27 to move the lens 22, which can be readily implemented by one skilled in the art. Thus, in some examples, the housing 21 (shown in FIG. 4) may not be magnetized, and/or the magnetized holder 26 may not be magnetized or may not be employed. Additionally, in certain applications, the drivers may be connected to the ignition controller 13, so that the ignition controller 13 may control the beam steering unit 14 in accordance with the operational parameters of the internal combustion engine 100, and coordinate the laser 11 and the beam steering unit 14 to facilitate focusing of the laser beam at one or more locations within the combustion chamber 101.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the subsequent claims.

What is claimed is:

1. A laser ignition system for an internal combustion engine, the laser ignition system comprising:
    a laser configured to generate a laser beam; and
    a beam steering unit comprising a lens and a prism both configured to cooperatively transmit the laser beam to focus on an oxygenated fuel mixture supplied into a combustion chamber of the internal combustion engine, wherein the beam steering unit further comprises a housing moveably coupled to the combustion chamber of the internal combustion engine, and wherein the lens and the prism are disposed in the housing.

2. The laser ignition system of claim 1, further comprising an ignition controller connected to the laser to control the generation of the laser beam.

3. The laser ignition system of claim 1, wherein the prism comprises a reflective prism, wherein the lens is configured to focus and transmit the laser beam to the reflective prism, and wherein the reflective prism is configured to transmit the focused laser beam to focus on the oxygenated fuel mixture supplied into the combustion chamber of the internal combustion engine.

4. The laser ignition system of claim 3, wherein the prism comprises a four-sided reflective prism or a three-sided reflective prism.

5. The laser ignition system of claim 1, wherein the lens and the prism move together with the housing.

6. The laser ignition system of claim 5, wherein the beam steering unit further comprises one or more of a piezo-electric actuator, a hydraulic driver, a pneumatic driver, and a metal winding driver, which is configured to move the housing.

7. The laser ignition system of claim 1, wherein the beam steering unit further comprises a holder moveably held in the housing to hold the lens.

8. The laser ignition system of claim 7, wherein the holder is magnetized, and wherein the beam steering unit further comprises a copper winding driver disposed around the housing to move the magnetized holder.

9. A beam steering unit, comprising:
a lens;
a prism, wherein the lens is configured to focus and transmit a laser beam to the prism, and wherein the prism is configured to transmit the focused laser beam to focus on an oxygenated fuel mixture supplied into a combustion chamber of an internal combustion engine; and
a housing accommodating the lens and the prism, wherein the lens moves linearly in the housing.

10. The beam steering unit of claim 9, wherein the prism comprises a four-sided reflective prism or a three-sided reflective prism.

11. The beam steering unit of claim 9, wherein the housing is coupled to the combustion chamber of the internal combustion engine.

12. The beam steering unit of claim 11, wherein the housing is configured to moveably couple to the combustion chamber of the internal combustion engine, and wherein the lens, the prism, and the housing move together.

13. The beam steering unit of claim 12, wherein the housing is magnetized, and wherein the beam steering unit further comprises a copper winding driver disposed around the housing to move the magnetized housing.

14. The beam steering unit of claim 11, wherein the beam steering unit further comprises a holder linearly moveably disposed in the housing to hold the lens.

15. The beam steering unit of claim 14, wherein the holder is magnetized, and wherein the beam steering unit further comprises a metal winding driver disposed around the housing to move the magnetized holder.

16. A method for igniting a fuel mixture in an internal combustion engine, the method comprising:
generating a laser beam;
transmitting the laser beam through a lens to form a focused laser beam; and
transmitting the focused laser beam through a prism to focus the laser beam on the fuel mixture supplied into a combustion chamber of the internal combustion engine, wherein the lens moves linearly to transmit the laser beam.

17. The method of claim 16, wherein the lens and the prism are disposed in a housing, and wherein the housing is couple to the combustion chamber of the internal combustion engine.

18. The method of claim 17, further comprising moving the lens so that the laser beam is focused at a plurality of locations in the combustion chamber of the internal combustion engine.

19. The method of claim 16, wherein the prism comprises a four-sided reflective prism or a three-sided reflective prism.

20. A laser ignition system for an internal combustion engine, the laser ignition system comprising:
a laser configured to generate a laser beam; and
a beam steering unit comprising an adaptive lens and a transparent window both configured to cooperatively transmit the laser beam to focus at a plurality of locations within a combustion chamber of the internal combustion engine, wherein the beam steering unit further comprises a housing moveably coupled to the combustion chamber of the internal combustion engine.

21. The laser ignition system of claim 20, wherein the adaptive lens is moveably disposed in the housing.

22. The laser ignition system of claim 21, wherein the beam steering unit further comprises a holder moveably disposed in the housing to hold the adaptive lens.

23. The laser ignition system of claim 22, wherein the beam steering unit further comprises one or more of a piezo-electric actuator, a hydraulic driver, a pneumatic driver, and a metal winding driver, which is configured to move the holder.

24. The laser ignition system of claim 23, wherein the holder is magnetized, and wherein the beam steering unit further comprises the metal winding driver disposed around the housing to move the magnetized holder.

* * * * *